(No Model.)
T. LIEB.
HANDLE FOR FAUCETS.
No. 494,577. Patented Apr. 4, 1893.
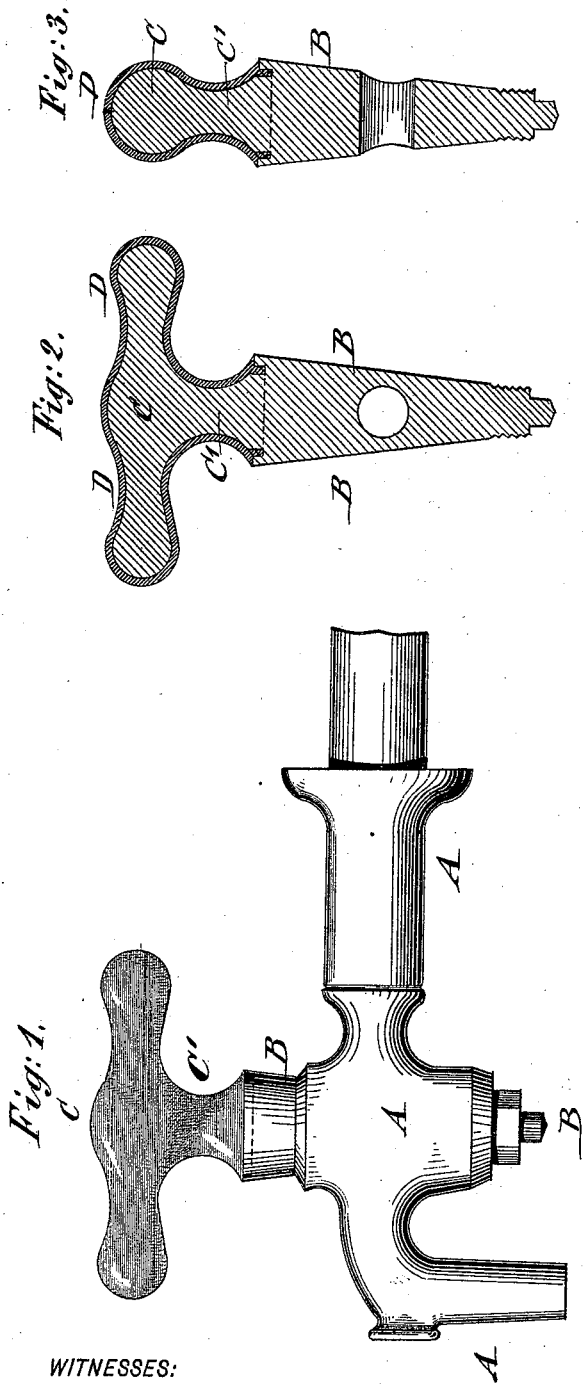
WITNESSES:
INVENTOR
BY
ATTORNEYS.

UNITED STATES PATENT OFFICE.

THOMAS LIEB, OF BROOKLYN, ASSIGNOR TO LIEB SONS, OF NEW YORK, N. Y.

HANDLE FOR FAUCETS.

SPECIFICATION forming part of Letters Patent No. 494,577, dated April 4, 1893.

Application filed April 21, 1892. Serial No. 430,020. (No model.)

*To all whom it may concern:*

Be it known that I, THOMAS LIEB, a citizen of the United States, and a resident of the city of Brooklyn, in the county of Kings and State of New York, have invented certain new and useful Improvements in Handles for Faucets, of which the following is a specification.

The faucets heretofore in use for dispensing beer, ale and other fermented liquors are finished by silver-plating the entire faucet including the handle and the spigot. The plating of the handle is soon worn off by use, so that the faucets have to be replated from time to time. This is annoying and expensive and interferes with the proper working of the apparatus by which fermented liquors are drawn from the wood for dispensing the same.

The object of this invention is to provide the handles of spigots, faucets and other metal articles with a protective layer which is not liable to deterioration and change of color by wear, and by which a more finished and durable handle is furnished: and my invention consists of the handles of faucets or other metal articles provided with a layer of plastic material that is molded around the handle and the shank of the spigot and pressed into an annular groove in the head of the spigot, as will be fully described hereinafter and finally pointed out in the claim.

In the accompanying drawings, Figure 1 represents a side elevation of a faucet with my improved handle. Figs. 2 and 3 are vertical transverse-sections through the handle and spigot, said sections being taken respectively at right-angles to each other, and Fig. 4 is a side elevation of a different form of handle for a faucet or other metallic article.

Similar letters of reference indicate corresponding parts.

Referring to the drawings, A represents a faucet or other article of metal, B the spigot of the same, C the handle and C' the shank of the spigot. The handle C and shank C' are slightly reduced in size, for about one-eighth of an inch, and then coated with a layer of celluloid D, rubber or other plastic material which is molded around the same in the usual manner, the layer of plastic material being preferably made of two longitudinal semi-sections, which are cut so as to correspond to the shape of the handle and shank and which are then placed on the handle and shank and subjected in molds of corresponding size to hydraulic pressure, or to a vulcanizing process, according as a protective layer of celluloid or rubber is applied to the spindle and shank of the spigot. The surplus stock of the covering layer D is crowded into an annular groove $d$, that is formed in the head of the spigot near the circumference of the same, as shown in Figs. 2 and 3 tending to lock said covering into said head. A smooth and nice finish is thus imparted directly to the handle, when it is removed from the mold.

The covering-layer D of celluloid, hard rubber or other material may be of any suitable color, or in imitation of ivory or marble or mottled according to the taste of the parties who order said faucets.

The protective covering imparts not only a very ornamental appearance to the faucet or other article of metal, but forms also a durable protecting layer for the handle, so that the same can be used for a considerable length of time without showing wear and without requiring a new covering. Whenever the covering is worn out, so that it has to be renewed, another spigot provided with a covered handle can be replaced for the old spigot and the covering of the latter be renewed.

Having thus described my invention, I claim as new and desire to secure by Letters Patent—

A faucet whereof the turning plug comprises a spigot, a reduced shank and a handle, the head of said spigot being provided with an annular groove, and said handle and shank being provided with a protective coating which extends into said groove.

In testimony that I claim the foregoing as my invention I have signed my name in presence of two subscribing witnesses.

THOMAS LIEB.

Witnesses:
PAUL GOEPEL,
CHARLES SCHROEDER.